(12) United States Patent
Faue

(10) Patent No.: US 6,201,413 B1
(45) Date of Patent: Mar. 13, 2001

(54) SYNCHRONOUS INTEGRATED CIRCUIT DEVICE UTILIZING AN INTEGRATED CLOCK/COMMAND TECHNIQUE

(75) Inventor: Jon Allan Faue, Colorado Springs, CO (US)

(73) Assignees: United Memories, Inc., Colorado Springs, CO (US); Nippon Steel Corporation, Chiba (JP)

(*) Notice: Subject to any disclaimer, the term of this patent is extended or adjusted under 35 U.S.C. 154(b) by 0 days.

(21) Appl. No.: 09/164,661

(22) Filed: Oct. 1, 1998

(51) Int. Cl.$^7$ ................................................ H03K 19/096
(52) U.S. Cl. .................................................. 326/93; 326/98
(58) Field of Search ........................................ 326/93–98

(56) References Cited

U.S. PATENT DOCUMENTS

| | | | |
|---|---|---|---|
| 5,801,559 | * 9/1998 | Sawai et al. | 327/116 |
| 6,049,241 | * 4/2000 | Brown et al. | 327/295 |
| 6,084,453 | * 7/2000 | Fuse et al. | 327/176 |

* cited by examiner

*Primary Examiner*—Michael Tokar
*Assistant Examiner*—Don Phu Le
(74) *Attorney, Agent, or Firm*—William J. Kubida; Hogan & Hartson LLP

(57) ABSTRACT

A technique for integrating an internal clock signal with various function commands in an integrated circuit device having an externally supplied clock signal to create a set of command clocks which have the same rising (or falling) edge time, duty cycle and duration and are, therefore, inherently clocked to ameliorate signal "race" and "skew" conditions encountered in prior designs. The technique of the present invention, therefore, improves overall device operational speeds in executing commands by reducing internal gate delays and resulting in faster data access times in integrated circuit memory devices such as synchronous dynamic random access memory ("SDRAM") devices. Moreover, because the resultant design provides faster operation times, lower cost process technologies may be utilized to achieve substantially comparable performance levels.

23 Claims, 6 Drawing Sheets

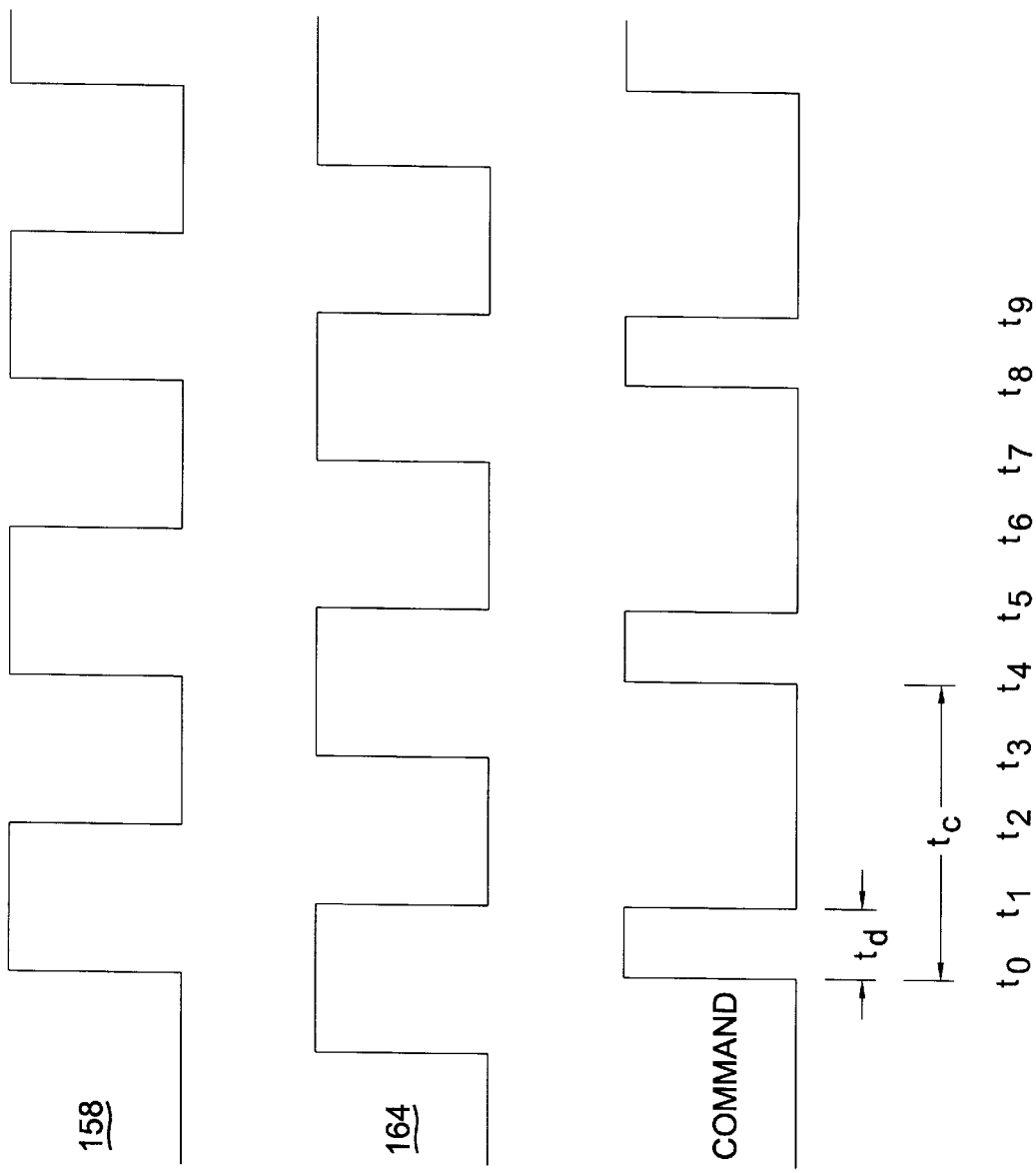

SYNCHRONOUS INTEGRATED CIRCUIT DEVICE UTILIZING AN INTEGRATED CLOCK/COMMAND TECHNIQUE

BACKGROUND OF THE INVENTION

The present invention relates, in general, to the field of integrated circuit ("IC") devices. More particularly, the present invention relates to a technique for integrating the internal clock signal and functional commands in IC devices utilizing an externally supplied clock signal and requiring a positive set-up time to discern and/or execute commands. The technique of the present invention is especially advantageous when implemented in conjunction with memory ICs, including synchronous dynamic random access memory ("SDRAM") devices.

In many integrated circuit devices utilizing an externally supplied clocking signal, a relatively large clock buffer is typically utilized to amplify, or "buffer", the signal to then drive a derivative internal clock signal which is routed to various of the IC's command executing portions. Commands directing the IC to then execute a specific function are then compared against the internal clock signal and executed if the resultant logic is correct. This is an inherently slow process inasmuch as the clock must first be "buffered up" (i.e. amplified) in order to drive the relatively large capacitance of the on-chip clock network with more speed reducing gate delays being added in ultimately deciding which commands to execute.

SUMMARY OF THE INVENTION

The technique of the present invention is of especial utility in achieving overall faster device speed by integrating the clock signal with the various executable commands to an IC device as soon as possible to create a parallel set of clock command signals. In this way, the clock signal itself is integrated with the commands eliminating the necessity of providing a "main clock" signal routed internally throughout the chip. As a consequence, all of the commands generated in this way are, in fact, clock signals as well. That is, they each have the same rising (or falling) edge time, duty cycle and duration as that previously provided by a typically generated internal clock function.

Importantly, generating the commands early and integrating them with the clock signal itself results in a much decreased loading on the device internal clock line where, typically, only one command can be generated on a given cycle. Consequently, the integration of the clock and command signals shares as much drive power as possible between the commands resulting in substantial integrated circuit die area and device power savings.

Through the use of the technique of the present invention, overall faster execution of commands is achieved thereby affording faster data access times in integrated circuit memory applications. Concomitantly, this faster execution time allows lower performance (i.e. less expensive) process technologies to be used to achieve comparable overall performance targets. Still further, since all commands are now inherently synchronized as to their rise time and duration (and hence, their fall time), a number of internal "race" conditions are obviated which might otherwise potentially lead to device logic errors.

Particularly disclosed herein is an integrated circuit which comprises an external clock pad for receiving an input clock signal and a clock buffer for buffering the input clock signal and providing a buffered clock signal at an output thereof. The integrated circuit further comprises a reset circuit coupled to the output of the clock buffer for delaying the buffered clock signal to produce a delayed clock signal and at least one selectively enablable command logic circuit operative in response to the buffered clock signal and the delayed clock signal to provide a clock command signal having a first state thereof initiated on a first logic level transition of the buffered clock signal and a second state thereof initiated on an opposite second logic level transition of the delayed clock signal.

Further disclosed herein is a process for integrating an internal clock signal with a number of functional commands in an integrated circuit device. The process comprises: providing an external clock signal to the device; buffering the external clock signal to provide an internal clock signal having n gate delays; delaying the internal clock signal to provide an internal reset signal having n+1 additional gate delays; and utilizing the internal clock and reset signals in conjunction with a selected one of a number of enable signals to cause a corresponding one of the functional commands to transition to a first signal level thereof when the internal clock and reset signals are both in a first state thereof and to transition to a second signal level thereof when the reset signal transitions to a second state thereof.

Also further disclosed herein is a process for implementing functional commands in an integrated circuit device. The process comprises: supplying an external clock signal to the integrated circuit device; buffering the external clock signal to provide a buffered clock signal; deriving a delayed clock signal corresponding to the buffered clock signal; combining the buffered clock signal and the delayed clock signal to provide a clock command signal having a first state thereof initiated on a selected transition of the buffered clock signal and having a second state thereof initiated on an opposite transition of the delayed clock signal; and routing the clock command signal to command executing portions of the integrated circuit device in lieu of the buffered clock signal.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 3 illustrates some representative timing waveforms for certain signals in the circuit of FIG. 2 instructive in further understanding its operation and showing the resultant duty cycle and duration of the various integrated clock/commands provided thereby;

DESCRIPTION OF A PREFERRED EMBODIMENT

Figure 1:
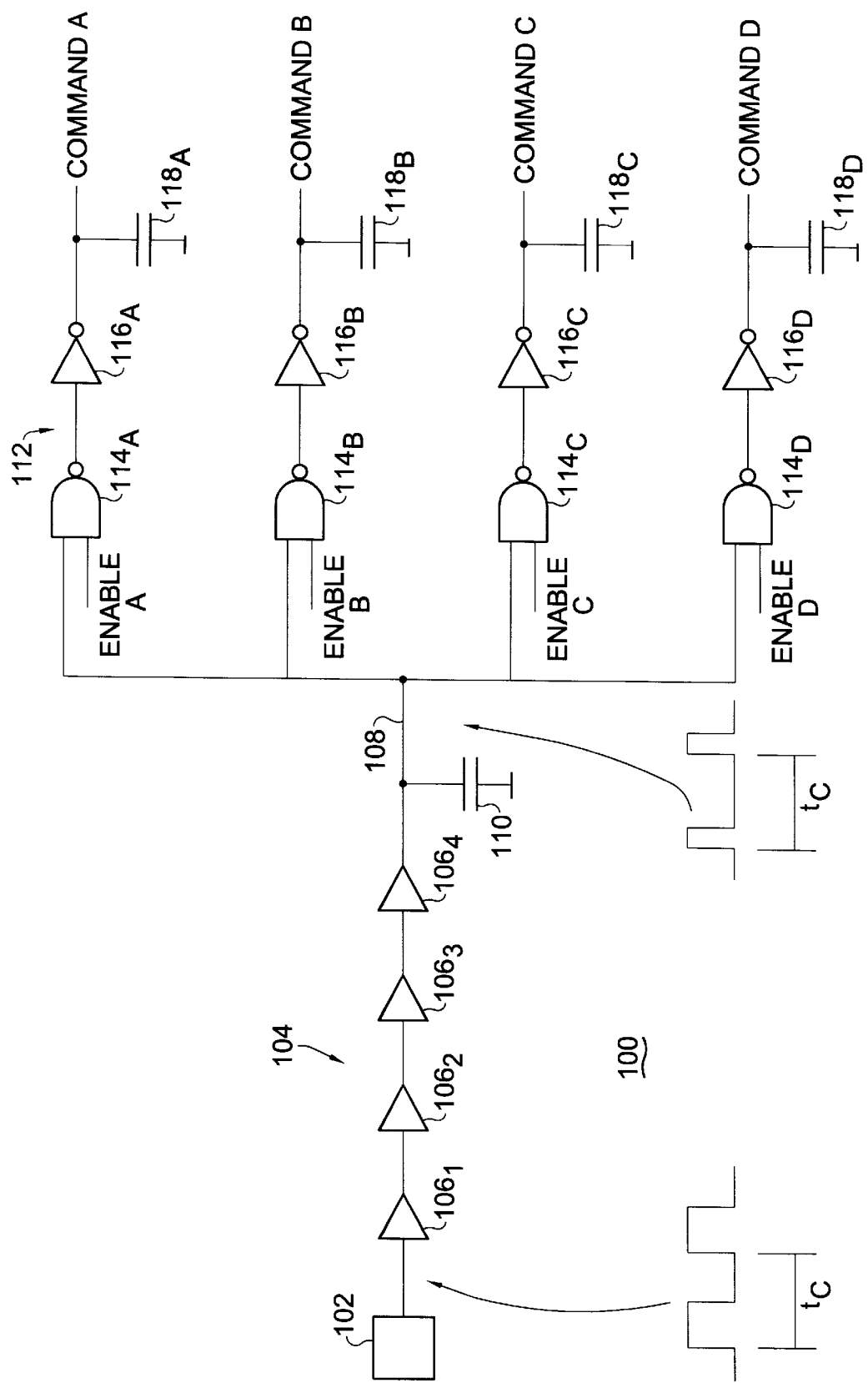
FIG. 1 is a simplified functional logic block diagram of a prior art circuit illustrating an external clock signal pad coupled to an internal clock buffer to provide an internal clock signal to a number of logic elements selectively enabled to provide a corresponding number of device commands.

With reference now to FIG. 1, a functional logic block diagram of a prior art circuit 100 is shown. The circuit 100 includes an external clock signal pad 102 coupled to an internal clock buffer 104. The clock buffer 104 comprises a relatively large number of non-inverting amplifiers $106_1$ through $106_4$ to buffer the clock signal with each such amplification stage imposing a delay thereto. The output of the clock buffer 104 is then distributed throughout the on-chip circuitry on internal clock (CLK") line 108 having a relatively large inherent capacitance 110 to provide an internal clock signal to a number of logic elements 112 which may be selectively enabled to provide a corresponding number of on-chip device commands.

In the representative embodiment shown, the prior art circuit 100 logic elements 112 comprise a number of two-input NAND gates $114_A$ through $114_D$ inclusive, each having one input thereof coupled to receive the internal clock signal on internal clock line 108 and the other input thereof coupled to a respective enable signal line ("Enable A" through "Enable D" inclusive). The output terminal of the NAND gates $114_A$ through $114_D$ are respectively coupled to the input terminal of a corresponding one of inverting amplifiers $116_A$ through $116_D$ inclusive, while the outputs thereof comprise signal lines having a corresponding inherent capacitance $118_A$ through $118_D$ for Command A, Command B, Command C and Command D respectively which commands are then distributed throughout the integrated circuit chip as appropriate.

As can be seen with respect to the prior art circuit 100, not only is there a relatively large delay inherent in the large number of amplifiers $106_1$ through $106_4$ of the clock buffer 104, the resultant internal clock signal on line 108 experiences an undesired amount of initial loading due to capacitance 110 as well as even more network loading due to capacitances $118_A$ through $118_D$.

Figure 2:
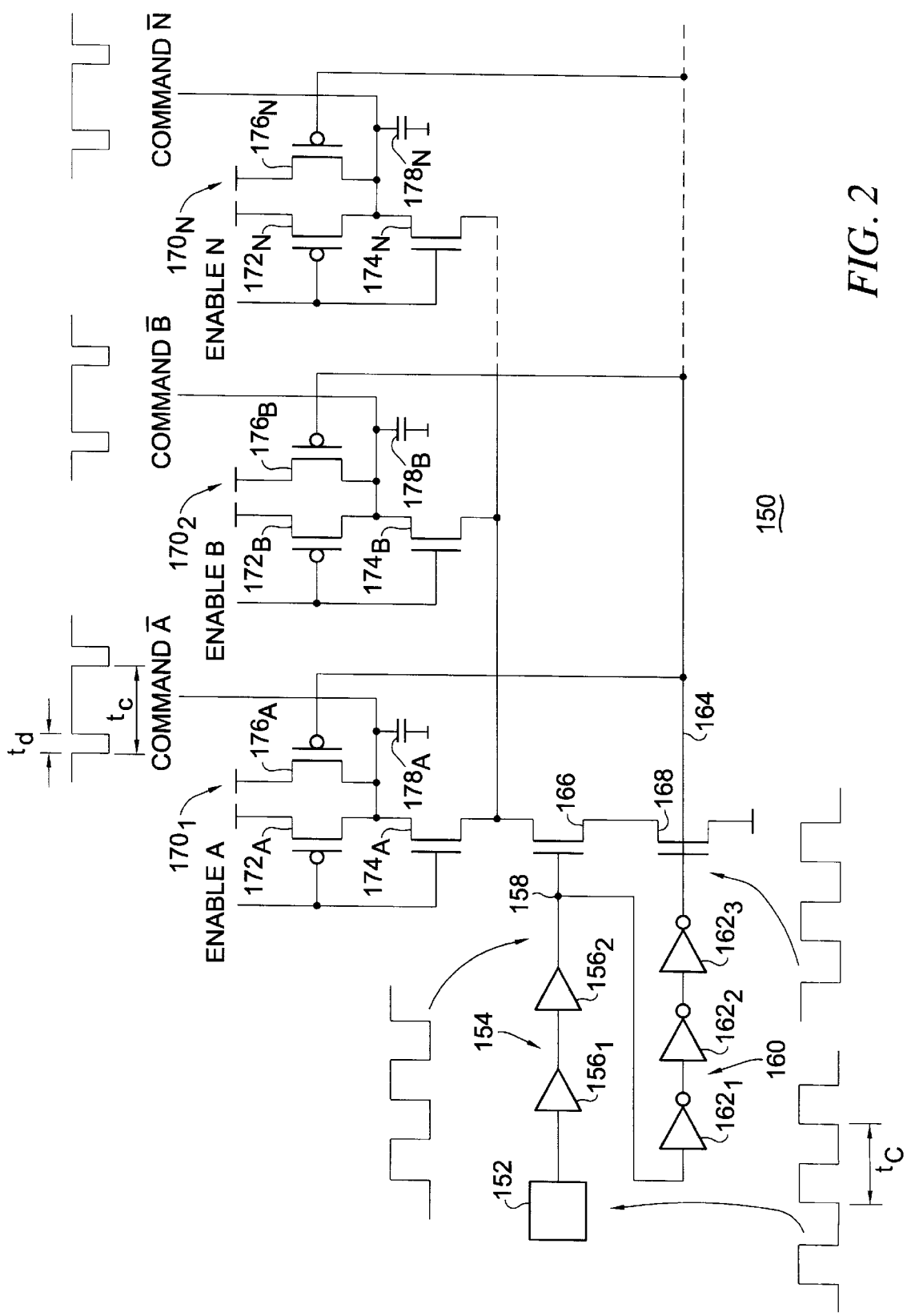
FIG. 2 is a simplified functional logic block diagram of a corresponding circuit implemented in accordance with the technique of the present invention illustrating a minimal gate delay internal clock buffer and wherein the commands are integrated with the clock signal as soon as practicable to create internal command clock signals having the same rising edge (or falling edge) time, duty cycle and duration.

With reference additionally now to FIG. 2, a functional logic block diagram of a corresponding exemplary circuit 150 implemented in accordance with the technique of the present invention is shown illustrating an external clock pad 152 and a minimal gate delay internal clock buffer 154 comprising only two non-inverting amplifiers $156_1$ and $156_2$. The output of the clock buffer 154 appears on clock node 158 and, as will be more fully described hereinafter, unlike the prior art circuit of FIG. 1, an internal clock signal is not distributed to circuits throughout the chip so that few amplification stages may be used and with concomitantly less gate delay being introduced.

The clock node 158 provides a non-inverted clock signal to a reset circuit 160 comprising, in the embodiment illustrated, an odd number (i.e. three) inverting amplifiers $162_1$ through $162_3$. The clock buffer 154 and reset circuit 160 are configured to provide minimal loading and distribution of an on-chip clock signal to be combined with, and generate, each command and the device commands are, in essence integrated with the clock signal as soon as practicable to create internal command clock signals having the same rising edge (or falling edge) time, duty cycle and duration.

The clock node 158 is coupled to the gate of n-channel transistor 166 which is coupled in series with n-channel transistor 168 which, in turn, has its gate coupled to the output of the reset circuit 160 and its source terminal coupled to circuit ground ("$V_{ss}$").

A predetermined number of command logic circuits $170_1$ through $170_N$ correspond to each device command as required and each comprises a series coupled p-channel transistor $172_A$ (through $172_N$) and n-channel transistor $174_A$ (through $174_N$) respectively in series with n-channel transistors 166 and 168 as shown. The gate terminals of the p-channel transistors 172 and n-channel transistors 174 are coupled to an associated command enable line and the source terminal of the p-channel transistors 172 is coupled to a supply voltage source ("$V_{cc}$"). An additional p-channel transistor $176_A$ through $176_N$ is coupled in parallel with the corresponding one of the p-channel transistors 172 and has its gate coupled to the output of the reset circuit 160 at node 164. The node intermediate the p-channel transistors 172 and n-channel transistors 174 provides the combined command clock signal ("Command") to the on-chip circuitry having an associated capacitance $178_A$ through $178_N$ respectively as shown in response to the activation of a corresponding one of the enable signal lines. The combined command clock signals ("Command $\overline{A}$", "Command $\overline{B}$" through "Command $\overline{C}$") all have the same duration ("$t_d$") and cycle ("$t_c$") as illustrated.

With reference additionally now to FIG. 3, some representative timing waveforms for certain signals in the circuit of FIG. 2 are shown which are instructive in further understanding the operation of the circuit 100. The upper timing waveform illustrates the buffered clock signal appearing at the clock node 158 and the middle waveform shows the corresponding delayed and inverted signal appearing at the node 164 following the reset circuit 160. The waveforms at clock node 158 and node 164 are illustrated as having a duty cycle of 50% (pulse duration divided by the clock frequency) for purposes of simplified illustration only.

Assuming that an enable signal has been introduced to one of the command logic circuits $170_1$ through $170_N$, a logic high level on the clock node 158 (due to the buffered clock signal) at the gate of n-channel transistor 166 (time $t_0$) will turn it on and a coincident logic high level at node 164 at the gate of n-channel transistor 168 (already occurring at time $t_0$) will also turn it on. This common condition occurs, in the embodiment illustrated, on the rising edge of the clock signal at the clock node 158. This then serves to pull the node common to all of the command logic circuits $170_1$ through $170_N$ to $V_{ss}$ and a negative going pulse then appears on the command line of the correspondingly enabled command logic circuit $170_1$ through $170_N$ since the respective p-channel transistor $176_A$ through $176_N$ is then held in an "off" condition by the logic "high" level on node 164. When the logic level on node 164 then transitions to a logic "low" state at time $t_1$, this serves to turn off n-channel transistor 168 and return the p-channel transistor 176 of the enabled command logic circuit $170_1$ through $170_N$ to an "on" condition thereby causing the signal on the corresponding command line to transition to a logic "high" level at that time.

At time $t_2$ both n-channel transistors 166, 168 are "off" and at time $t_3$ n-channel transistor 166 is "off" thereby precluding any output signal on the command line of any enabled one of the command logic circuits $170_1$ through $170_N$ until time $t_4$ when the conditions then correspond to those of time $t_0$. Times $t_5$ through $t_8$ then correspond to times $t_1$ through $t_4$ with time $t_9$ corresponding also to time $t_5$. It is apparent that a simple inversion can be performed to obtain the "Command A", "Command B" and "Command N" signals as may be required.

As a consequence, a combined clock command signal with a pulse duration of $t_d$ is produced that is synchronized with the external clock applied to the clock pad 152 and has the same frequency. This has been accomplished with minimal delay through the use of a minimal delay clock buffer 154 and an inverting reset circuit 160 applied to a series coupled pair of n-channel transistors 166, 168 in common with the various command logic circuits $170_1$ through $170_N$, only one of which is functionally operative in the embodiment illustrated, at any one time. Because of this, less amplification is required by the clock buffer 154 and the combined clock command signal is then distributed on chip instead of the need for a relatively long internal clock path as in the prior art circuit 100 of FIG. 1.

Figure 4A:
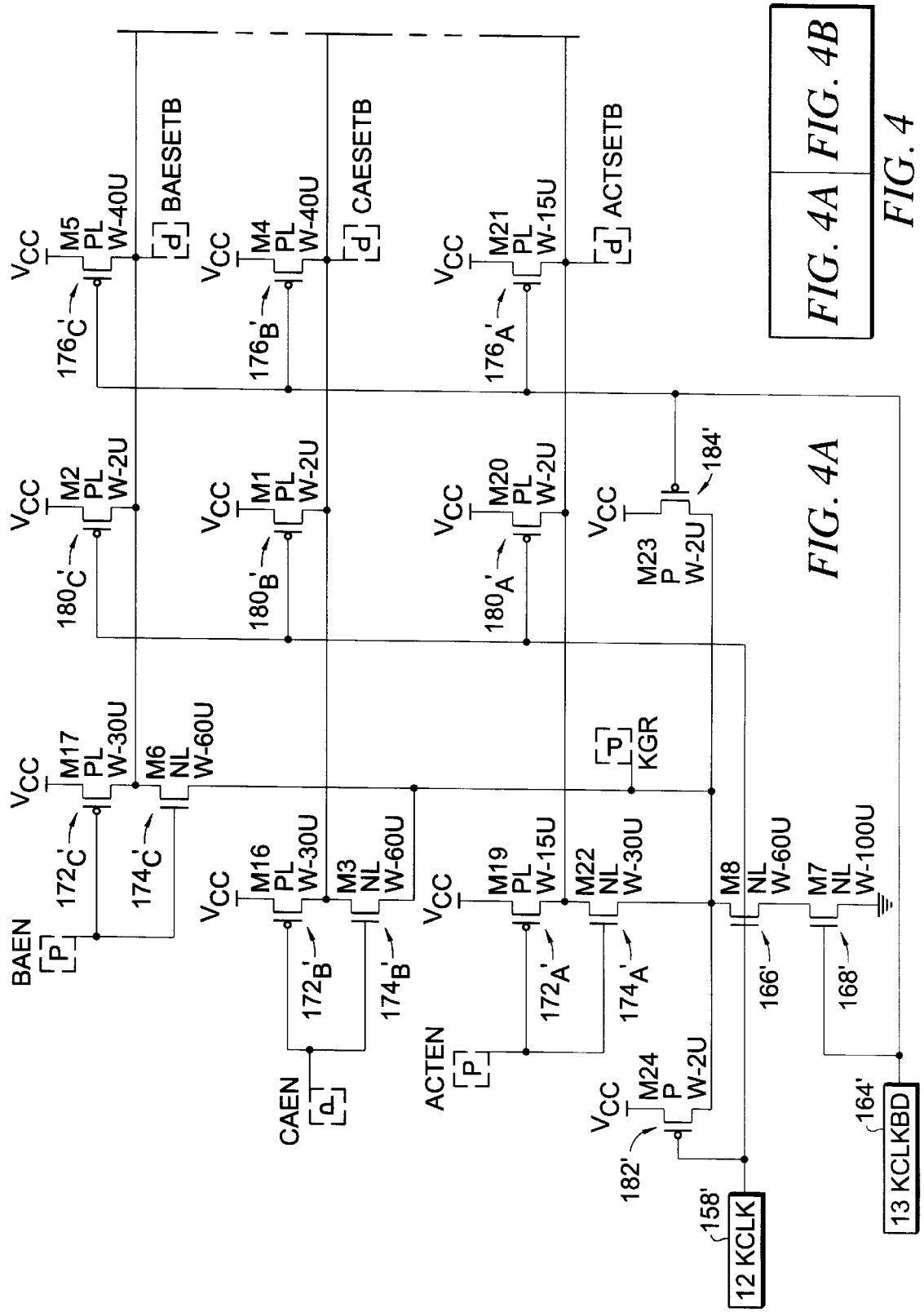
FIG. 4 is an additional gate level representation of an actual circuit implemented in accordance with the technique of the present invention corresponding to the circuit of FIG. 2 for use in conjunction, for purposes of example only, a synchronous DRAM.
Figure 4B:
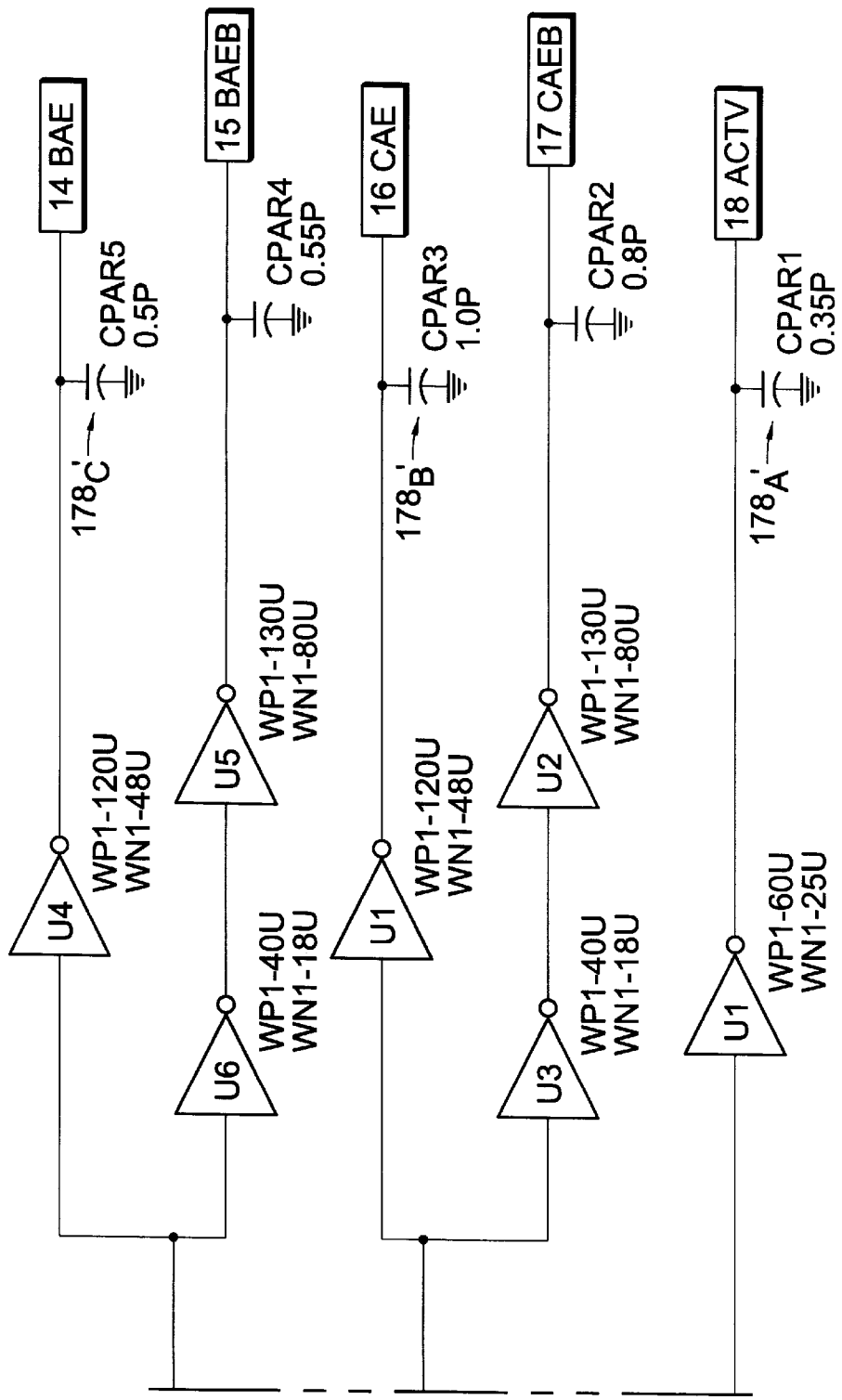

With reference additionally now to FIG. 4, a gate level representation of an actual circuit $150^1$ implemented in accordance with the technique of the present invention is shown. The circuit $150^1$ may be used, for example, in implementing the generation and distribution of clock commands in accordance with the technique of the present invention, for purposes of example only, in a synchronous DRAM. The portions of circuit $150^1$ corresponding to those illustrated with respect to the preceding FIG. 2 are like number with the addition of a prime symbol superscript ("$^1$") and the foregoing description thereof shall suffice herefor.

Further illustrated in this figure are representative and relative device sizes for the various active elements making up the circuit $150^1$ and, as can be seen, a relatively small p-channel transistor $180_A$ through $180_C$ of approximately 2 microns ("U") has been added to each of the command lines with its gate terminal coupled to the clock node $158^1$. They are made relatively small so that the KCLK signal does not determine the clock command pulse width $t_d$ inasmuch as they cannot reset the command in a time period of less than $t_d$. The n-channel transistors $166^1$ and $168^1$ are both made relatively large at 60 U and 100 U respectively. P-channel transistors $180_A$ through $180_C$ are also made relatively small to reduce fanout on the KCLK clock node $158^1$. Due to the fact that the external clock has two gate delays introduced due to the two stage clock buffer 154 (FIG. 2), fanout is an important consideration. In contrast, p-channel transistors $176_A{}^1$ through $176_C{}^1$ are relatively large and must be made sufficiently large to reset commands when the signal on node $164^1$ (KCLKBD=KCLK Bar Delayed) transitions to a logic "low" state. P-channel transistors 182 and 184 coupled to KCLK and KCLKBD respectively are utilized to prevent "glitches" on node ACTSETB (Active Set Bar) when ACTEN (Active Enable) goes "high" or, when node KGR goes "high" while KCLK is "low".

Figure 5:
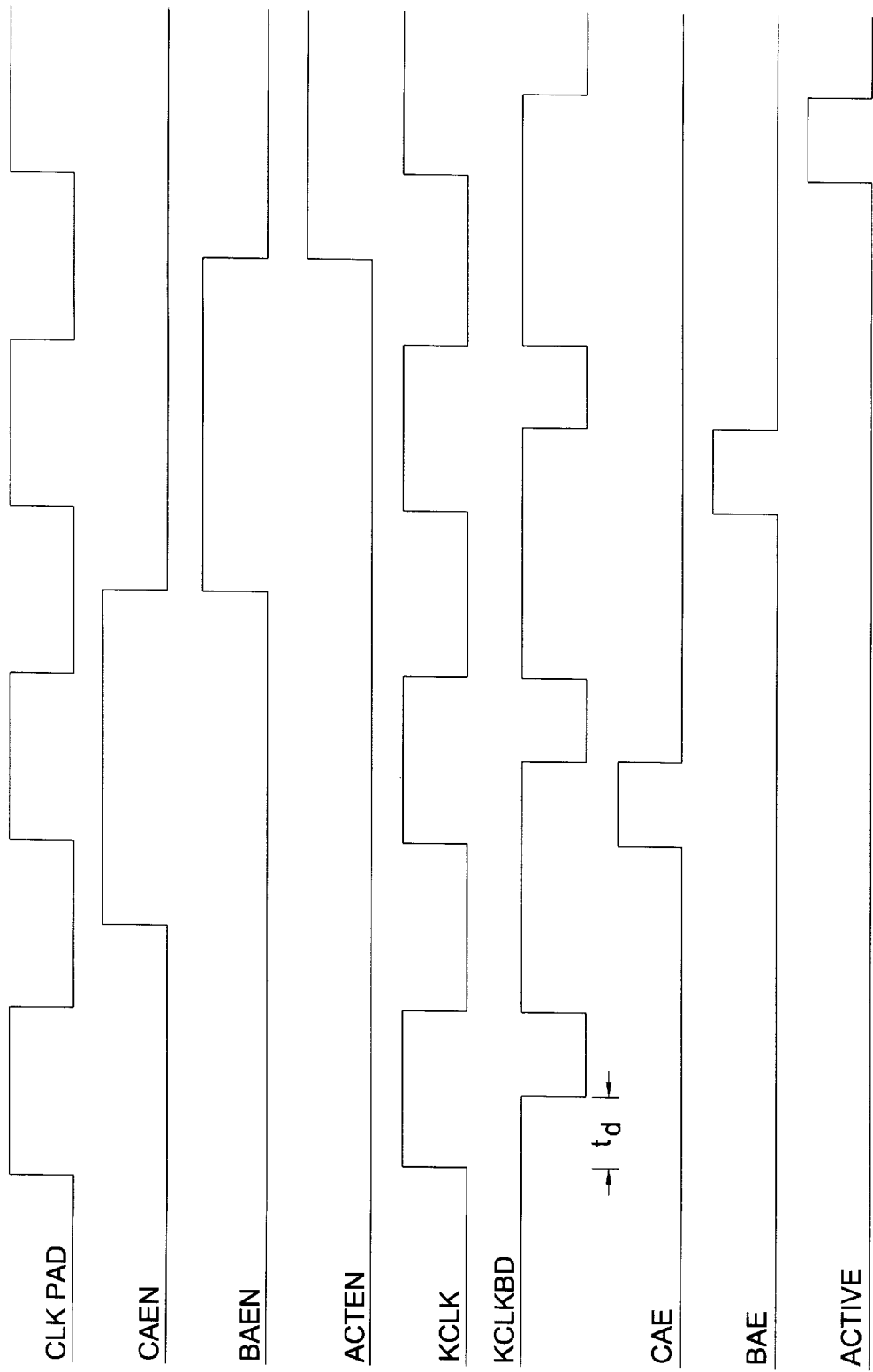
FIG. 5 further illustrates some representative timing waveforms for a number of the signals in the circuit of FIG. 4.

With reference additionally now to FIG. 5, some representative timing waveforms for a number of the signals in the circuit of FIG. 4 are shown. CLK PAD (Clock Pad) is the clocking signal applied to the external clock pad 152 (FIG. 2) which is applied through a relatively low amplification and delayed clock buffer 154 to provide the signal KCLK. CAEN and BAEN (Column Address Enable and Burst Address enable respectively) together with ACTEN are enable signals corresponding to those labeled as Enable A through Enable N in FIG. 2 while CAE, BAE and ACTV (Active) correspond to the combined clock command signals at the outputs of the command logic circuits $170_1$ through $170_N$. As can be seen KCLK exhibits the same frequency, pulse duration and duty cycle as the external clock signal applied as CLK PAD while KCLKBD has a delay of $t_d$ and a duty cycle of 25% in the particular embodiment shown. In operation, depending on which of the CAEN, BAEN or ACTEN signals has been asserted, a corresponding clock command signal appears on command lines CAE, BAE or ACTV respectfully, all occurring on the same clock edge and having the same pulse duration and cycle.

What has been provided, therefore, is a technique for integrating an internal clock signal with various function commands in an integrated circuit device having an externally supplied clock signal to create a set of command clocks which have the same rising (or falling) edge time, duty cycle and duration and are, therefore, inherently clocked to ameliorate signal "race" and "skew" conditions encountered in prior designs. The technique of the present invention, therefore, improves overall device operational speeds in executing commands by reducing internal gate delays and resulting in faster data access times in integrated circuit memory devices such as SDRAM devices. Moreover, because the resultant design provides faster operation times, lower cost process technologies may be utilized to achieve substantially comparable performance levels.

While there have been described above the principles of the present invention in conjunction with specific circuit implementations it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. An integrated circuit comprising:
   an external clock pad for receiving an input clock signal;
   a clock buffer for buffering said input clock signal and providing a buffered clock signal at an output thereof;
   a reset circuit coupled to said output of said clock buffer for delaying said buffered clock signal to produce a delayed clock signal; and
   at least one selectively enablable command logic circuit operative in response to said buffered clock signal and said delayed clock signal to provide a clock command signal having a first state thereof initiated on a first logic level transition of said buffered clock signal and a second state thereof initiated on an opposite second logic level transition of said delayed clock signal.

2. The integrated circuit of claim 1 wherein said clock buffer comprises a pair of series coupled amplifiers.

3. The integrated circuit of claim 1 wherein said clock buffer comprises no more than two amplifications stages.

4. The integrated circuit of claim 1 wherein said reset circuit comprises three series coupled inverting amplifiers.

5. The integrated circuit of claim 1 wherein said reset circuit comprises no more than three series coupled inverting amplifiers.

6. The integrated circuit of claim 1 wherein said at least one selectively enablable command logic circuit comprises a plurality of said command logic circuits.

7. The integrated circuit of claim 6 wherein said plurality of said command logic circuits are alternatively enablable.

8. The integrated circuit of claim 6 wherein said plurality of command logic circuits are commonly coupled to first and second series coupled switching devices each having a control terminal thereof coupled to receive said buffered clock signal and said delayed clock signal respectively.

9. The integrated circuit of claim 8 wherein each of said plurality of command logic circuits further comprises third and fourth series coupled switching devices having common connected control terminals thereof coupled to an enable input and a command output defined by an intermediate node therebetween, said third and fourth series coupled switching devices being coupled in series with said first and second series coupled switching devices.

10. The integrated circuit of claim 9 wherein each of said plurality of command logic circuits further comprises a fifth switching device coupled to said command output in parallel with said fourth switching device and having a control terminal thereof coupled to receive said delayed clock signal.

11. The integrated circuit of claim 8 wherein said first and second series coupled switching devices comprise n-channel transistors.

12. The integrated circuit of claim 9 wherein said third and fourth series coupled switching devices comprise n-channel and p-channel transistors respectively.

13. The integrated circuit of claim 10 wherein said fifth switching device comprises a p-channel transistor.

14. The integrated circuit of claim 10 wherein said first and second series coupled switching devices are relatively larger than said fifth switching devices.

15. The integrated circuit of claim 1 wherein said integrated circuit comprises a synchronous dynamic random access memory device.

16. The integrated circuit of claim 1 wherein said buffered clock signal and said delayed clock signal have a given delay and said clock command signal has a duty cycle independent of said buffered clock signal.

17. A process for integrating an internal clock signal with a number of functional commands in an integrated circuit device comprising:

providing an external clock signal to said device;

buffering said external clock signal to provide an internal clock signal having n gate delays;

delaying said internal clock signal to provide an internal reset signal having (n+an odd number) additional gate delays; and utilizing said internal clock and reset signals in conjunction with a selected one of a number of enable signals to cause a corresponding one of said number of functional commands to transition to a first signal level thereof when said internal clock and reset signals are both in a first state thereof and to transition to a second signal level thereof when said reset signal transitions to a second state thereof.

18. The process of claim 17 wherein said step of providing an external clock signal is carried out by the step of:

supplying said external clock signal with any given duty cycle.

19. The process of claim 17 wherein said step of buffering said external clock signal is carried out by means of a clock buffer having no more than two series coupled amplification stages.

20. The process of claim 17 wherein said step of delaying said internal clock signal is carried out by means of a reset circuit having an odd number of series coupled inverting amplification stages.

21. The process of claim 17 wherein said step of utilizing said internal clock and reset signals comprises the steps of:

firstly transitioning a selected one of said functional commands to said first signal level thereof upon said internal clock signal transitioning to said first state thereof; and secondly transitioning said selected one of said functional commands to said second signal level thereof upon said reset signal transitioning to said second state thereof.

22. The process of claim 17 wherein said functional commands are alternatively enablable.

23. A process for implementing functional commands in an integrated circuit device comprising:

supplying an external clock signal to said integrated circuit device;

buffering said external clock signal to provide a buffered clock signal;

deriving a delayed clock signal corresponding to said buffered clock signal;

combining said buffered clock signal and said delayed clock signal to provide a clock command signal having a first state thereof initiated on a selected transition of said buffered clock signal and having a second state thereof initiated on an opposite transition of said delayed clock signal; and routing said clock command signal to command executing portions of said integrated circuit device in lieu of said buffered clock signal.

* * * * *